United States Patent
Coover et al.

(10) Patent No.: US 11,954,148 B2
(45) Date of Patent: *Apr. 9, 2024

(54) MATCHING AUDIO FINGERPRINTS

(71) Applicant: Gracenote, Inc., Emeryville, CA (US)

(72) Inventors: Robert Coover, Orinda, CA (US);
Jeffrey Scott, Berkeley, CA (US);
Konstantinos Antonios Dimitriou, Bavaria (DE)

(73) Assignee: Gracenote, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/187,431

(22) Filed: Feb. 26, 2021

(65) Prior Publication Data

US 2021/0182335 A1 Jun. 17, 2021

Related U.S. Application Data

(63) Continuation of application No. 15/115,733, filed as application No. PCT/US2016/044041 on Jul. 26, 2016, now Pat. No. 10,936,651.

(30) Foreign Application Priority Data

Jun. 22, 2016 (GR) .............................. 20160100335

(51) Int. Cl.
*G06F 16/63* (2019.01)
*G06F 16/61* (2019.01)
(Continued)

(52) U.S. Cl.
CPC ............ *G06F 16/683* (2019.01); *G06F 16/61* (2019.01); *G06F 16/63* (2019.01); *G06F 16/65* (2019.01)

(58) Field of Classification Search
CPC ........ G06F 16/683; G06F 16/61; G06F 16/63; G06F 16/65
See application file for complete search history.

(56) References Cited

U.S. PATENT DOCUMENTS

| | | |
|---|---|---|
| 7,013,301 B2 | 3/2006 | Holm et al. |
| 8,238,669 B2 | 8/2012 | Covell et al. |

(Continued)

FOREIGN PATENT DOCUMENTS

| | | |
|---|---|---|
| EP | 3476121 A1 | 5/2019 |
| JP | 2004505328 A | 2/2004 |

(Continued)

OTHER PUBLICATIONS

Kim et al. "Robust Audio Fingerprinting Method Using Prominent Peak Pair Based on Modulated Complex Lapped Transform". 2014. (9 pages).

(Continued)

*Primary Examiner* — Maher N Algibhah
(74) *Attorney, Agent, or Firm* — McDonnell Boehnen Hulbert & Berghoff LLP

(57) ABSTRACT

Methods, apparatus, systems and articles of manufacture are disclosed to select reference sub-fingerprints for comparison to query sub-fingerprints based on a determination that a query sub-fingerprint is a match with a reference sub-fingerprint, generate a count vector that stores total counts of matches between the query sub-fingerprints and different subsets of the reference sub-fingerprints, each of the different subsets being aligned to the query sub-fingerprints at a different offset from a reference point, each of the different offsets being mapped by the count vector to a different total count, calculate a maximum count among the total counts, a median of the total counts, and a difference between the maximum count and the median of the total counts, and classify the reference sub-fingerprints as a match with the (Continued)

query sub-fingerprints based on the difference between the maximum count in the count vector and the median.

17 Claims, 10 Drawing Sheets

(51) Int. Cl.
  *G06F 16/65* (2019.01)
  *G06F 16/683* (2019.01)

(56) References Cited

U.S. PATENT DOCUMENTS

| | | | |
|---|---|---|---|
| 8,396,705 | B2 | 3/2013 | Bilobrov |
| 8,886,531 | B2 | 11/2014 | Vogel |
| 9,286,902 | B2 | 3/2016 | Han et al. |
| 9,460,201 | B2 | 10/2016 | Anniballi |
| 9,501,568 | B2 | 11/2016 | Rafii |
| 9,536,546 | B2 | 1/2017 | Motta et al. |
| 10,936,651 | B2 | 3/2021 | Coover et al. |
| 2002/0083060 | A1 | 6/2002 | Wang et al. |
| 2002/0116195 | A1 | 8/2002 | Ptiman et al. |
| 2006/0190450 | A1 | 8/2006 | Holm et al. |
| 2007/0143777 | A1 | 6/2007 | Wang |
| 2009/0052784 | A1 | 2/2009 | Covell et al. |
| 2011/0173208 | A1 | 7/2011 | Vogel |
| 2012/0310537 | A1 | 12/2012 | Wolber et al. |
| 2013/0057761 | A1* | 3/2013 | Bloom ............. H04N 21/43072 348/E9.034 |
| 2013/0110870 | A1 | 5/2013 | Conwell |
| 2013/0275421 | A1 | 10/2013 | Resch et al. |
| 2014/0280304 | A1 | 9/2014 | Scherf et al. |
| 2014/0316787 | A1 | 10/2014 | Wang et al. |
| 2015/0120308 | A1 | 4/2015 | Leistikow et al. |
| 2015/0170660 | A1 | 6/2015 | Han et al. |
| 2015/0295667 | A1 | 10/2015 | Wang |
| 2016/0148620 | A1 | 5/2016 | Bilobrov |

FOREIGN PATENT DOCUMENTS

| | | | |
|---|---|---|---|
| JP | 2005518594 | | 6/2005 |
| JP | 2005518594 | A | 6/2005 |
| JP | 2012095309 | A | 5/2012 |
| WO | 2017222569 | A1 | 12/2017 |

OTHER PUBLICATIONS

Haitsma et al. "A Highly Robust Audio Fingerprinting System". 2002. (9 pages).
Zhu et al. "A Novel Audio Fingerprinting Method Robust to Time Scale Modification and Pitch Shifting". 2010. (5 pages).
Covell et al. "Waveprint: Efficient wavelet-based audio fingerprinting". 2008. (4 pages).
Baluja et al. "Audio Fingerprinting: Combining Computer Vision & Data Stream Processing". 2007. (5 pages).
European Patent Office, "European Search Report," Issued in connection with European Patent Application No. 16906474.8, dated Dec. 5, 2019, (9 pages).
Japanese Patent Office, "Notice of Reasons for Rejection," issued in connection with Japanese patent application No. 2018-566921, dated Mar. 10, 2020, (7 pages).
Japanese Patent Office, "Notice of Allowance," issued in connection with Japanese patent application No. 2018-566921, dated Sep. 29, 2020, (4 pages).
International Searching Authority, "International Search Report and Written Opinion," issued in connection with PCT application No. PCT/US16/44041, dated Oct. 6, 2016, (15 pages).
United States Patent and Trademark Office, "Non-Final Office Action," issued in connection with U.S. Appl. No. 15/115,733, dated Jan. 23, 2019, (20 pages).
United States Patent and Trademark Office, "Non-Final Office Action," issued in connection with U.S. Appl. No. 15/115,733, dated May 27, 2020, (19 pages).
United States Patent and Trademark Office, "Notice Of Allowance and Fee(s) Due," issued in connection with U.S. Appl. No. 15/115,733, dated Oct. 15, 2020, (13 pages).
United States Patent and Trademark Office, "Final Office Action," issued in connection with U.S. Appl. No. 15/115,733, dated Aug. 29, 2019, (19 pages).
European Patent Office, "Communication under Rule 71(3) EPC—Intention to Grant", dated Oct. 7, 2021, in connection with European Application No. 16 906 474.8, 5 pages.
Japan Patent Office, "Notice of Reasons for Rejection", dated Oct. 19, 2021, in connection with Japan Application No. 2020-177940, 8 pages.
European Patent Office, "Decision to grant a European patent pursuant to Article 97(1) EPC", issued in connection with European Application No. 16906474.8, dated Mar. 3, 2022, 2 pages.
Japan Patent Office, "Notice of Allowance", dated Apr. 26, 2022, in connection with Japan Application No. 2020-177940, 6 pages.

* cited by examiner

US 11,954,148 B2

MATCHING AUDIO FINGERPRINTS

RELATED APPLICATION

This patent arises from a continuation of U.S. patent application Ser. No. 15/115,733, which was filed on Aug. 1, 2016, which is U.S. National Stage Filing under 35 U.S.C. 371 from International Application No. PCT/US2016/044041, filed on Jul. 26, 2016, and published as WO2017222569 on Dec. 28, 2017, which claims the benefit of priority to Greek Application No. 20160100335, which was filed on Jun. 22, 2016. U.S. patent application Ser. No. 15/115,733, International Application No. PCT/US2016/044041, and Greek Application No. 20160100335 is hereby incorporated herein by reference in their entirety. Priority to U.S. patent application Ser. No. 15/115,733, International Application No. PCT/US2016/044041, and Greek Application No. 20160100335 is hereby claimed.

TECHNICAL FIELD

The subject matter disclosed herein generally relates to the technical field of special-purpose machines that perform or otherwise facilitate audio processing, including computerized variants of such special-purpose machines and improvements to such variants, and to the technologies by which such special-purpose machines become improved compared to other special-purpose machines that perform or otherwise facilitate audio processing. Specifically, the present disclosure addresses systems and methods to facilitate matching of digital fingerprints (e.g., audio fingerprints).

BACKGROUND

A machine may be configured to determine whether one audio fingerprint matches another audio fingerprint. For example, the machine may perform such determinations as part of providing a fingerprint matching service to one or more client devices. In some cases, the machine may interact with one or more users by making such determinations and providing notifications of the results of such determinations to one or more users (e.g., in response to one or more requests). Moreover, the machine may be configured to interact with a user by identifying audio content in response to a request that the audio content be identified. Such a machine may be implemented in a server system (e.g., a network-based cloud of one or more server machines), a client device (e.g., a portable device, an automobile-mounted device, an automobile-embedded device, or other mobile device), or any suitable combination thereof.

BRIEF DESCRIPTION OF THE DRAWINGS

Some embodiments are illustrated by way of example and not limitation in the figures of the accompanying drawings.

DETAILED DESCRIPTION

Figure 1:
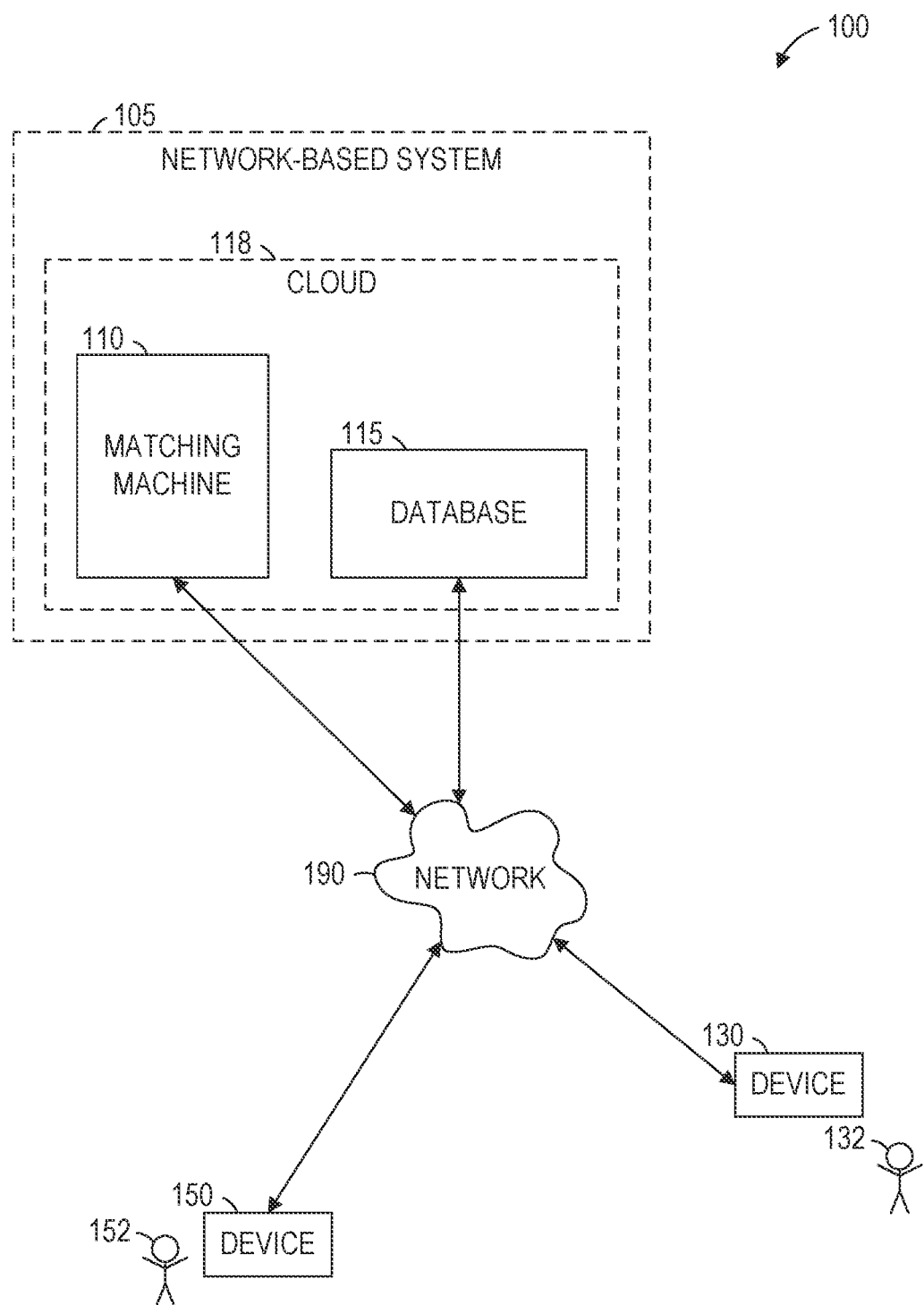
FIG. 1 is a network diagram illustrating a network environment suitable for matching audio fingerprints, according to some example embodiments.

Example methods (e.g., algorithms) are executable to perform or otherwise facilitate matching of audio fingerprints, and example systems (e.g., special-purpose machines) are configured to perform or otherwise facilitate matching of audio fingerprints. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A matching machine (e.g., a fingerprint matching machine) may form all or part of an audio processing system (e.g., a network-based audio processing system), and the matching machine may be configured (e.g., by one or more software modules) to match audio fingerprints by determining whether an audio fingerprint (e.g., a query fingerprint) matches another audio fingerprint (e.g., a reference fingerprint). The matching of audio fingerprints may be performed as part of identifying audio content based on a determination that that two audio fingerprints (e.g., a query fingerprint and a reference fingerprint) match each other (e.g., within a threshold tolerance). As noted above, such identifying of audio may be performed in response to (e.g., to fulfill) one or more user requests.

The matching machine accordingly accesses (e.g., receives, retrieves, or reads) a query fingerprint generated from query audio. The query fingerprint includes query sub-fingerprints that have been generated from query segments of a portion of the query audio (e.g., requested to be identified). Similarly, a reference fingerprint generated from reference audio includes reference sub-fingerprints that have been generated from reference segments of reference audio (e.g., of known identity). The matching machine accesses a database in which an index maps the reference sub-fingerprints to points (e.g., time points) at which their corresponding reference segments occur in the reference audio. Based on the index, the machine selects the reference sub-fingerprints (e.g., as a set of candidate sub-fingerprints) for comparison to the query sub-fingerprints. The selection of the reference sub-fingerprints is based on a determination by the matching machine that a query sub-fingerprint among the query sub-fingerprints matches a reference sub-fingerprint among the reference sub-fingerprints. This determination also identifies a reference point at which a reference segment occurs in the reference audio.

The matching machine is configured to identify a best-matching subset of the reference sub-fingerprints by evaluating (e.g., determining and counting) total matches between the query sub-fingerprints and different subsets of the reference sub-fingerprints. To do this, the matching machine iteratively shifts the query sub-fingerprints to different offsets from the reference position, evaluates a total count of sub-fingerprint matches (e.g., a total number of matching sub-fingerprints) for each offset, and generates a count vector that stores the total counts mapped to their respective offsets. The matching machine then determines (e.g., calculates) a maximum count (e.g., a maximum total count) among the total counts stored in the count vector. The offset that corresponds to the maximum count also corresponds the best-matching subset of the reference sub-fingerprints. In addition, the matching machine may determine the difference between the maximum count and the median of all counts in the count vector.

The matching machine then classifies the reference sub-fingerprints (e.g., in their entirety) as a match with the query sub-fingerprints (e.g., in their entirety) based on the maximum count. For example, the matching machine may additionally calculate the median of the total counts, calculate a difference between the maximum count and the median, calculate a standard deviation of the total counts, and calculate a quotient of the difference divided by the standard deviation, to obtain a score (e.g., a peak prominence score) that indicates the degree to which the maximum count represents a prominent peak within the count vector. The matching machine may then compare the score to a predetermined threshold score (e.g., a minimum peak prominence score) and classify the reference sub-fingerprints as a match with the query sub-fingerprints based on this comparison.

To elaborate on the generation of the count vector, according to various example embodiments, the evaluating of the total matches may be performed by determining the exact number of peaks that exist in both the query and reference sub-fingerprints that are being compared. Detection of such peaks may be done on a sub-fingerprint-by-sub-fingerprint basis at each different offset around the reference position. For each pair of sub-fingerprints being compared, an intersection is performed by the matching machine. The cardinality of the resulting set is the number of matches for that pair of sub-fingerprints. This action may be performed once for each pair of sub-fingerprints at every offset. The sum of the cardinalities may then be paired with (e.g., stored in) one position of the count vector for that specific offset.

As an illustrative example, consider a situation in which a query has 60 sub-fingerprints and in which the reference position occurs at a specific offset. The matching machine evaluates 10 different offsets around the reference position. Accordingly, the count vector has 10 elements (e.g., one for each of the 10 different offsets). At each offset, the matching machine performs 60 intersections (e.g., between the query and reference sub-fingerprints) and obtains corresponding cardinalities therefrom. The matching machine then sums all of the cardinalities and stores the sum in the first element (e.g., corresponding to a first position for a first offset) of the count vector. This process is repeated 9 more times (e.g., once for each of the ten different offsets) to populate the count vector.

In addition, according to various example embodiments, the matching machine extracts one or more additional features from the count vector without using the maximum count in the count vector. Examples of such features include continuity of the counts at each different offset, noisiness, and symmetry of the count vector. In such example embodiments, the matching machine classifies the reference sub-fingerprints as a match with the query sub-fingerprints based on one or more of such additional features extracted from the count vector. In this sense, the count vector may be treated as a source signal from which the matching machine extracts features (e.g., with or without influence from the maximum count) that are relevant and helpful to the task of discriminating a match from a mismatch.

FIG. 1 is a network diagram illustrating a network environment 100 suitable for matching audio fingerprints, according to some example embodiments. The network environment 100 includes a matching machine 110, a database 115, and devices 130 and 150, all communicatively coupled to each other via a network 190. The matching machine 110, with or without the database 115, may form all or part of a cloud 118 (e.g., a geographically distributed set of multiple machines configured to function as a single server), which may form all or part of a network-based system 105 (e.g., a cloud-based audio processing server system configured to provide one or more network-based audio processing services to the devices 130 and 150). The matching machine 110 and the devices 130 and 150 may each be implemented in a special-purpose (e.g., specialized) computer system, in whole or in part, as described below with respect to FIG. 10.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer (e.g., installed within a car, a bus, a boat, or an aircraft), a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 10, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single machine, and the functions described herein for any single system or machine may be subdivided among multiple systems or machines.

The network 190 may be any network that enables communication between or among systems, machines, databases, and devices (e.g., between the matching machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
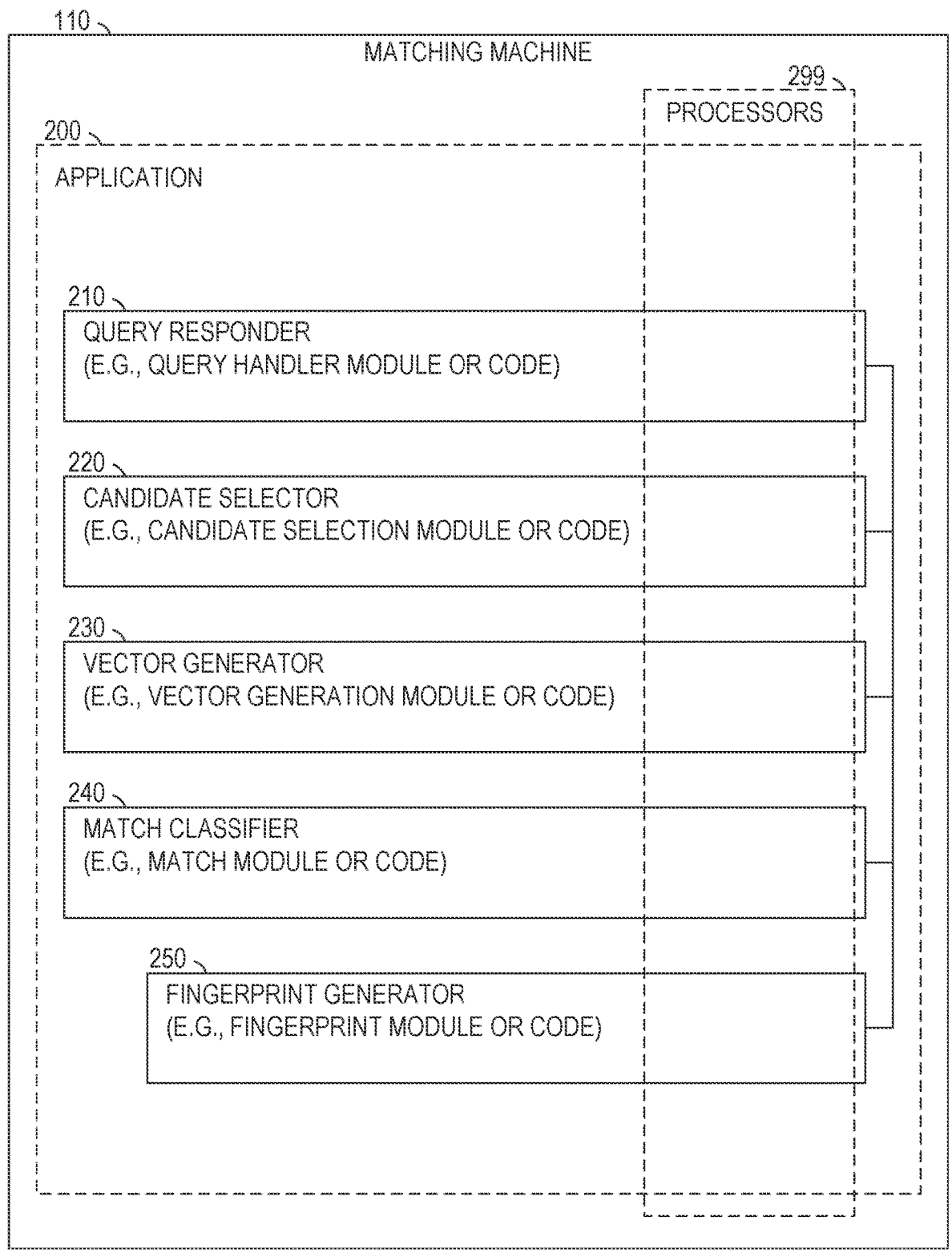
FIG. 2 is a block diagram illustrating components of a matching machine configured to perform matching of audio fingerprints, according to some example embodiments.

FIG. 2 is a block diagram illustrating components of the matching machine 110, according to some example embodiments. The matching machine 110 is shown as including a query responder 210, a candidate selector 220, a vector generator 230, a match classifier 240, and a fingerprint generator 250, all configured to communicate with each other (e.g., via a bus, shared memory, or a switch). According to various example embodiments, the query responder 210 may be or include a query handler module or other query handling code; the candidate selector 220 may be or include a candidate selection module or other candidate selecting code; the vector generator 230 may be or include a vector generation module or other vector generating code; the match classifier 240 may be or include a match classification module or other match classifying code; and the fingerprint generator 250 may be or include a fingerprint generation module or other fingerprint generating code.

As shown in FIG. 2, any one or more of the query responder 210, the candidate selector 220, the vector generator 230, the match classifier 240, and the fingerprint generator 250 may form all or part of an application 200 (e.g., a server application or a mobile app) that is stored (e.g., installed) on the matching machine 110 (e.g., responsive to or otherwise as a result of data being received from the device 130 via the network 190) and executable by the matching machine 110 (e.g., by one or more processors 299). Furthermore, one or more processors 299 (e.g., hardware processors, digital processors, or any suitable combination thereof) may be included (e.g., temporarily or permanently) in the application 200, the query responder 210, the candidate selector 220, the vector generator 230, the match classifier 240, the fingerprint generator 250, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 3:
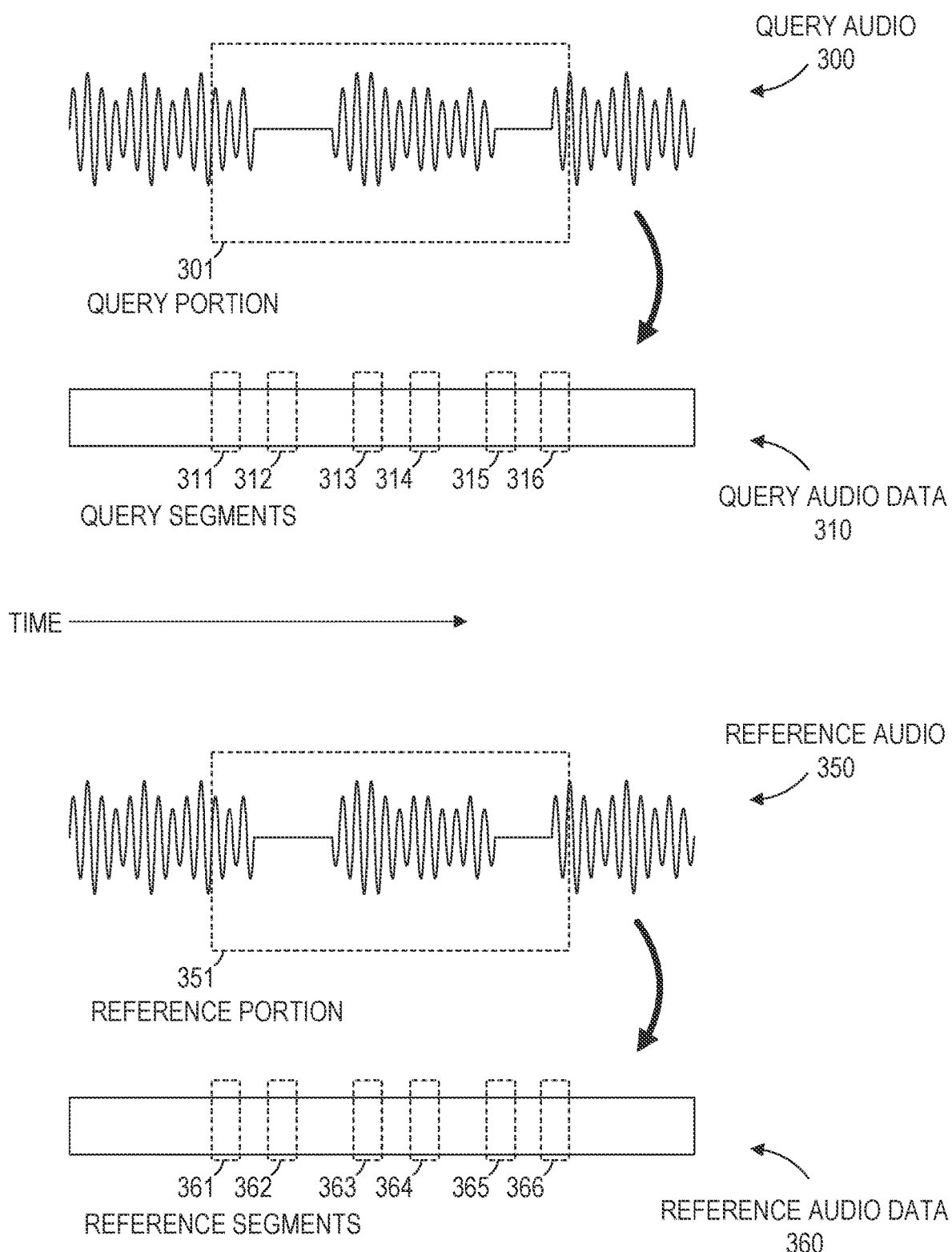
FIG. 3 is a conceptual diagram illustrating query audio, query audio data, reference audio, and reference audio data, according to some example embodiments.

FIG. 3 is a conceptual diagram illustrating query audio 300, query audio data 310, reference audio 350, and reference audio data 360, according to some example embodiments. As shown, the query audio 300 is represented by (e.g., sampled and encoded as) the query audio data 310, and a query portion 301 of the query audio 300 can be represented by query segments 311, 312, 313, 314, 315, and 316 (e.g., a set of query segments 311-316). The query segments 311-316 may be non-overlapping, overlapping, or a combination of both, according to various example embodiments. The query audio 300, the query audio data 310, or both, may be stored in the matching machine 110, the database 115, the device 130, or any suitable combination thereof.

Similarly, the reference audio 350 is represented by the reference audio data 360, and a reference portion 351 of the reference audio 350 can be represented by reference segments 361, 362, 363, 364, 365, and 366 (e.g., a set of reference segments 361-366). The reference segments 361-366 may be non-overlapping, overlapping, or a combination of both, according to various example embodiments. FIG. 3 also illustrates a direction of time to indicate temporal relationships (e.g., forwards or backwards in time) among the query segments 311-316 (e.g., with respect to the query audio 300 and the query audio data 310) and the reference segments 361-366 (e.g., with respect to the reference audio 350 and the reference audio data 360). The reference audio 350, the reference audio data 360, or both, may be stored in the matching machine 110, the database 115, the device 130, or any suitable combination thereof.

Figure 4:
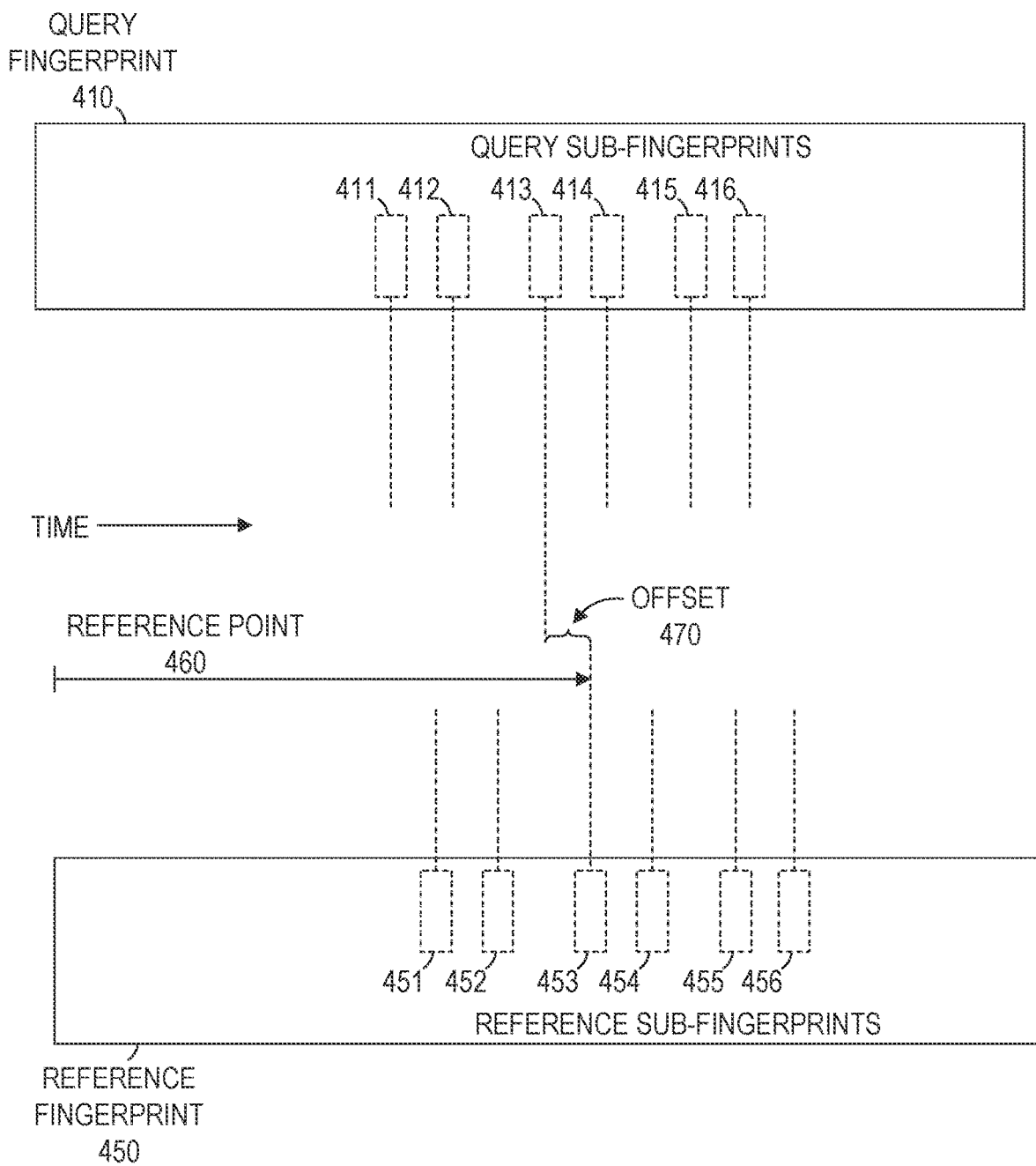
FIG. 4 is a conceptual diagram illustrating a query fingerprint and its constituent query sub-fingerprints being aligned, with an offset from a reference point, against a reference fingerprint and its constituent reference sub-fingerprints, according to some example embodiments.

FIG. 4 is a conceptual diagram illustrating a query fingerprint 410 and its constituent (e.g., included) query sub-fingerprints 411, 412, 413, 414, 415, and 416 (e.g., a set of query sub-fingerprints 411-416) aligned against a reference fingerprint 450 and its constituent reference sub-fingerprints 451, 452, 453, 454, 455, and 456 (e.g., a set of reference sub-fingerprints 451-456), according to some example embodiments. For clarity, the reference sub-fingerprints 451-456 are the only reference sub-fingerprints shown in FIG. 4, though additional reference sub-fingerprints are included in the reference fingerprints 450. Accordingly, the illustrated reference sub-fingerprints 451-456 are a subset of the reference sub-fingerprints that are included in the reference fingerprint 450. The query fingerprint 410, the reference fingerprints 450, or both, may be stored in the matching machine 110 and, the database 115, the device 130, or any suitable combination thereof.

In FIG. 4, a reference point 460 (e.g., a reference time point) indicates a location at which a reference segment (e.g., reference segment 363) whose corresponding reference sub-fingerprint (e.g., reference sub-fingerprint 453) matches a query sub fingerprint (e.g., query sub-fingerprint 413) occurs in the reference audio data 360, in the reference audio 350, or both. As shown in FIG. 4, the query sub-fingerprints 411-416 can be shifted (e.g., repositioned or realigned) relative to the reference sub-fingerprints 451-456 with an offset 470 from the reference point 460.

After at least one match has been found between the query sub-fingerprints 411-416 and the reference sub-fingerprints 451-456, different subsets of the reference sub-fingerprints in the reference fingerprints 450 (e.g., reference fingerprints 451-456) can be evaluated (e.g., by the matching machine 110) at different offsets from the reference point 460 to determine a total count of such matches for each offset. For example, the matching machine 110 may iteratively shift the query sub-fingerprints 411-416 by different offsets from the reference point 560 and, at each different offset, determine and count the number of total matches between the query sub-fingerprints 411-416 and a different subset of the reference fingerprints in the reference fingerprints 450 (e.g., reference sub-fingerprints 451-456).

According to various example embodiments, such shifts may be coarse shifts (e.g., shifts of several offset values at once), fine shifts (e.g., shifts of single offset values), or any suitable combination thereof. For example, the matching machine 110 may first perform coarse shifts to initially generate the count vector and determine a coarse offset (e.g., as an interim offset) that corresponds to a coarse total count (e.g., as an interim total count), before performing fine shifts to update the count vector and determine a fine offset (e.g., as a final offset or a fine-tuned offset) that identifies the set of reference sub-fingerprints (e.g., reference sub-fingerprints 451-456) that most closely matches the query sub-fingerprints 411-416.

Figure 5:
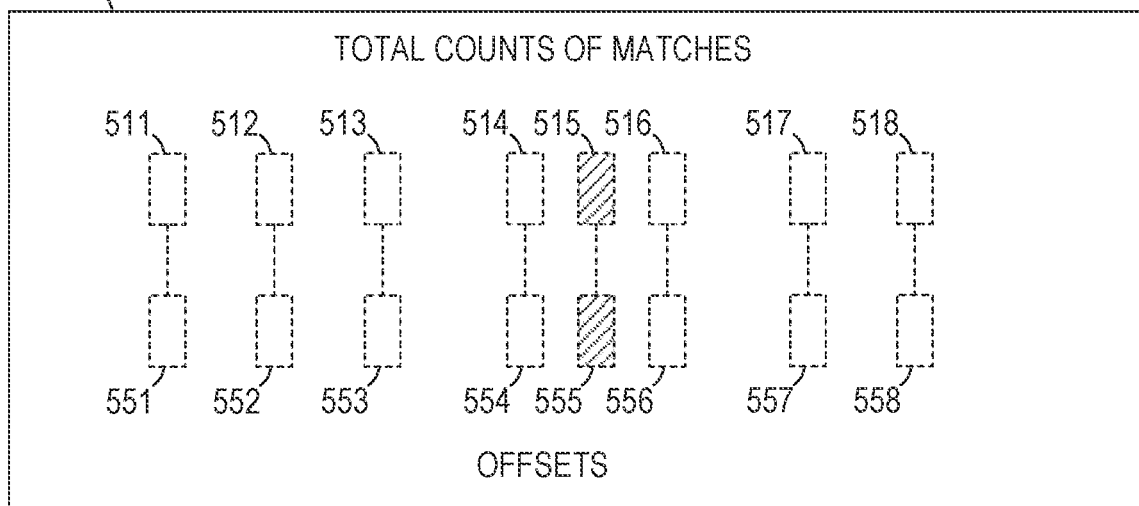
FIG. 5 is a conceptual diagram illustrating a count vector that stores total counts of matches, each paired with a different corresponding offset, according to some example embodiments.

FIG. 5 is a conceptual diagram illustrating a count vector 500 that stores total counts 511, 512, 513, 514, 515, 516, 517, and 518 of matches, with respectively corresponding offsets 551, 552, 553, 554, 555, 556, 557, and 558, according to some example embodiments. The offsets 551-558 are different values of the offset 470 from the reference point 460 (e.g., with positive values indicating relative temporal positions forward in time and negative values indicating relative temporal positions backward in time, or vice versa). As shown in FIG. 5, each total count (e.g., total count 515) corresponds to and is paired with (e.g., is mapped to or otherwise assigned to) a different corresponding offset (e.g., offset 555) by the count vector 500. The count vector 500 may be stored in the matching machine 110, the database 115, the device 130, or any suitable combination thereof.

Among the total counts 511-518 in the count vector 500 is a maximum total count (e.g., total count 515), and the maximum total count corresponds to an offset (e.g., offset 555) that indicates, specifies, or otherwise identifies a subset of the reference sub-fingerprints (e.g., reference sub-fingerprints 451-456) within the reference fingerprint 450. As described in greater detail below, a score (e.g., peak prominence score) can be calculated for this identified subset of the reference sub-fingerprints. Based on the calculated score, the subset of the reference sub-fingerprints can be classified as a match with the query sub-fingerprints 411-416 by the matching machine 110. Hence, based on this classification, the matching machine 110 may determine that the reference portion 351 of the reference audio 350 matches the query portion 301 of the query audio 300. Furthermore, the matching machine 110 may thus determine that the reference audio 350 matches the query audio 300, which may have the effect of identifying the query audio 300 (e.g., based on metadata that identifies or otherwise describes the reference audio 350).

Figure 6:
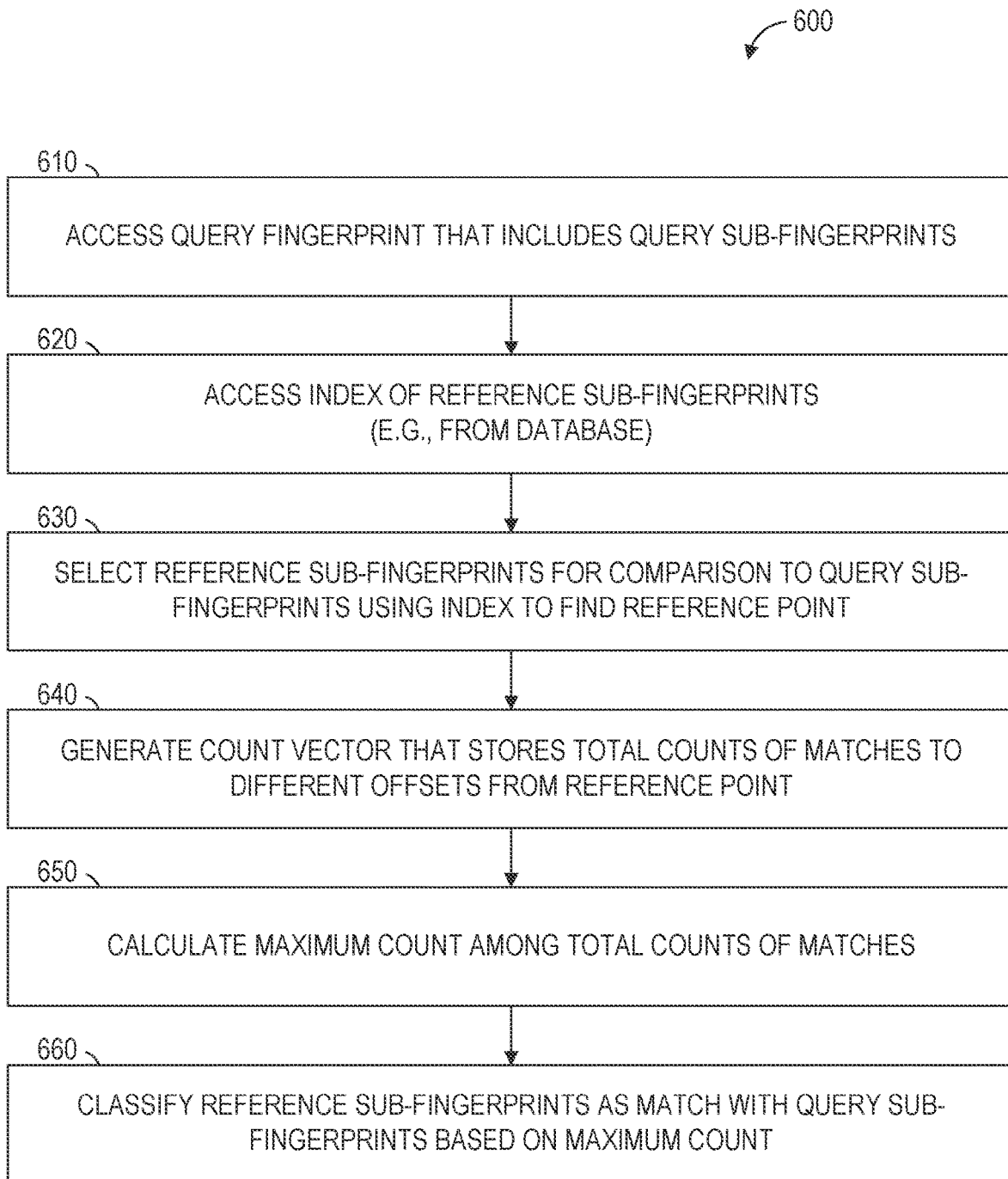
FIGS. 6, 7, 8, and 9 are flowcharts illustrating operations within a method of matching audio fingerprints, according to some example embodiments.

FIGS. 6, 7, 8, and 9 are flowcharts illustrating operations (e.g., by the matching machine 110 or by the device 130) in performing a method 600 of matching audio fingerprints, according to some example embodiments. Operations in the method 600 may be performed by the matching machine 110, using components (e.g., modules) described above with respect to FIG. 2, using one or more processors 299 (e.g., microprocessors or other hardware processors), or using any suitable combination thereof. In example embodiments in which the device 130 includes such components, the method 600 can be performed by the device 130. As shown in FIG. 6, the method 600 includes operations 610, 620, 630, 640, 650, and 660.

In operation 610, the query responder 210 accesses the query fingerprint 410 (e.g., with its included query sub-fingerprints 411-416). The query fingerprint 410 may be accessed from the matching machine 110, from the database 115, from the device 130 (e.g., as a result of the device 130 generating the query fingerprint 410), from the device 150 (e.g., as a result of the device 150 generating the query fingerprint 410), or any suitable combination thereof. As noted above, the query fingerprint 410 includes the query sub-fingerprints 411-416, which may be generated from the query segments 311-316 of the query audio 300 to be identified (e.g., generated from the query portion 301 of the query audio 300 to be identified).

In operation 620, the candidate selector 220 accesses an index of reference sub-fingerprints (e.g., indexing the reference sub-fingerprints 451-456 along with further reference sub-fingerprints). The index may be stored in the matching machine 110, database 115, the device 130, or any suitable combination thereof, and accessed therefrom. The index maps the reference sub-fingerprints 451-456 to points (e.g., time points, such as the reference point 460) at which the reference segments 361-366 occur in the reference audio data 360, in the reference portion 351, in the reference audio 350, or any suitable combination thereof. As noted above, the reference sub-fingerprints 451-456 are generated from the reference segments 361-366 of the reference audio 350 (e.g., generated from the reference portion 351 of the reference audio 350) of known identity (e.g., by virtue of an identifier of the reference audio 350 being stored as metadata within the matching machine 110, the database 115, the device 130, or any suitable combination thereof).

In operation 630, the candidate selector 220 uses the accessed index to select (e.g., designate or otherwise identify) reference sub-fingerprints (e.g., one or more of the reference sub-fingerprints 451-456) as candidate sub-fingerprints for comparison to the query sub-fingerprints 411-416 accessed in operation 620. This selection is based on a determination (e.g., performed by the candidate selector 220) that a query sub-fingerprint (e.g., query sub-fingerprint 413) among the query sub-fingerprints 411-416) is a match with a reference sub-fingerprint (e.g., reference sub-fingerprint 453) among the reference sub-fingerprints 451-456. That is, in an example embodiment, the candidate selector 220 determines that the query sub-fingerprint 413 matches the reference sub-fingerprint 453, and based on this determination, the candidate selector 220 selects the reference sub-fingerprints 451-456 as candidates for comparison to the query sub-fingerprints 411-416. The index accessed in operation 620 maps the reference sub-fingerprint 453 to the reference point 460. As noted above, the reference point 460 is a point (e.g., time point) at which the reference segment 363 occurs in the reference audio data 360 or the reference audio 350 (e.g., within the reference portion 351 of the reference audio 350).

In operation 640, the vector generator 230 generates the count vector 500 (e.g., within a memory in the matching machine 110, within the database 115, within the device 130, or any suitable combination thereof). As noted above, the count vector 500 stores the total counts 511-518 of matches, and the total counts 511-518 represent matches between the query sub-fingerprints 411-416 and different subsets of the reference sub-fingerprints contained in the reference fingerprint 450 (e.g., a subset that includes the reference sub-fingerprints 451-456). Moreover, as also noted above, each of the different subsets have a different offset from the reference point 460. In other words, each subset is aligned to the query sub-fingerprints 411-416 by a different offset (e.g., a different value for the offset 470) from the reference point 460. Thus, each of the different offsets (e.g., each of the offsets 551-558) is mapped by the count vector 500 to a different total count (e.g., one of the total counts 511-518) among the total counts in the count vector 500. For example, the count vector 500 may map the total 515 of matches to the offset 555 (e.g., as discussed above with respect to FIG. 5).

In operation 650, the match classifier 240 calculates a maximum total count among the total counts stored in the count vector 500 (e.g., a maximum among the total counts 511-518). According to various example embodiments, the match classifier 240 may perform one or more additional calculations, as discussed below.

In operation 660, the match classifier 240 classifies the reference sub-fingerprints 451-456 as a match with the query sub-fingerprints 411-416, and this classification may be based on the maximum total count that was calculated in operation 650 (e.g., along with results of one or more additional calculations performed by the match classifier 240). That is, the match classifier 240 may determine that the reference sub-fingerprints 451-456 constitutes a best-matching subset (e.g., interim best-matching subset or a final best-matching subset) of the reference sub-fingerprints stored in the reference fingerprint 450.

Figure 7:
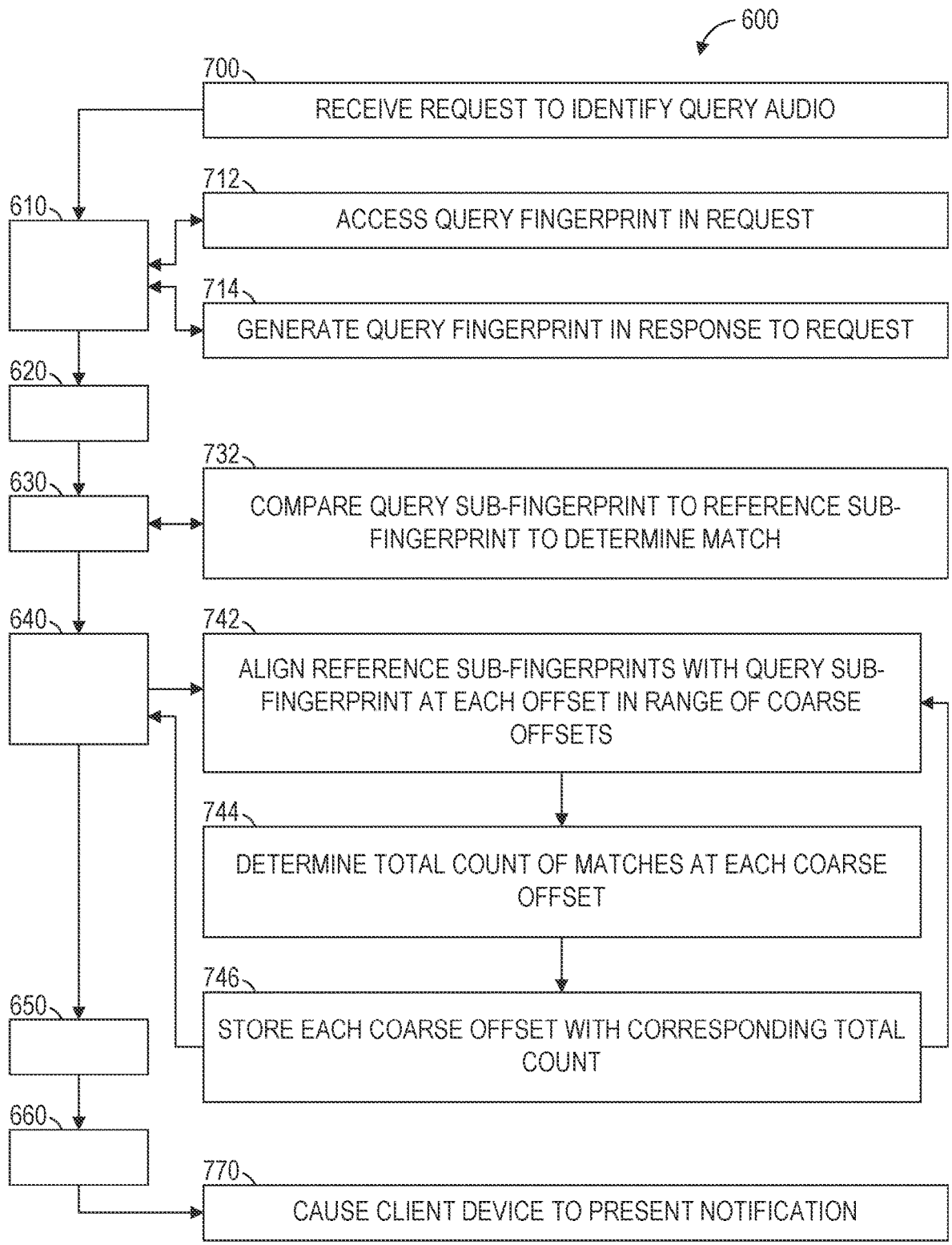

As shown in FIG. 7, in addition to one or more of the operations previously described, the method 600 may include one or more of operations 700, 712, 714, 732, 742, 744, 746, and 770. According to some example embodiments, operation 700 is performed before operation 610. In operation 700, the query responder 210 receives a request (e.g., sent by one of the devices 130 or 150) that the query audio 300 or the query portion 301 thereof be identified. The request may include the query portion 301, the query segments 311-316, the query fingerprint 410, the query sub-fingerprints 411-416, or any suitable combination thereof.

Either operation 712 or 714 may be performed as part (e.g., a precursor task, a subroutine, or a portion) of operation 610, in which the query responder 210 accesses the query fingerprint 410. In operation 712, the request received in operation 700 contains the query fingerprint 410, and the query responder 210 accesses the query fingerprint 410 from the received request. In operation 714, the request received in operation 700 contains the query portion 301 of the query audio 300 or the query segments 311-316, and the query responder 210 causes the fingerprint generator 250 to generate the query fingerprint 410 from such information (e.g., the query portion 301 or the query segments 311-316) contained in the received request. Accordingly, the query responder 210 may access the fingerprint 410 by having the fingerprint generator 250 generate the fingerprint 410.

Operation 732 may be performed as part (e.g., a precursor task, a subroutine, or a portion) of operation 630, in which the candidate selector 220 selects reference sub-fingerprints (e.g., reference sub-fingerprint 453) for comparison to the query sub-fingerprints 411-416. In operation 732, the candidate selector 220 compares a query sub-fingerprint (e.g., query sub-fingerprint 413) among the query sub-fingerprints 411-416 to a reference sub-fingerprint (e.g., reference sub-fingerprint 453) among the reference sub-fingerprints (e.g., reference sub-fingerprints 451-456) selected in operation 620. Accordingly, the candidate selector 220 may match the query sub-fingerprint 413 to the reference sub-fingerprint 453. As noted above, the reference sub-fingerprint 453 is mapped (e.g., by the index accessed in operation 620) to the reference point 460 at which the reference segment 363 occurs in the reference audio data 360, in the reference portion 351, in the reference audio 350, or in any suitable combination thereof.

The generation of the count vector 500 in operation 640 may include, for each different offset among multiple offsets (e.g., offsets 551-558, which may be coarse offsets in this example), performance of operations 742, 744, and 746. With each iteration of operations 742, 744, and 746, the vector generator 230 generates a total count of matches (e.g., one of the total counts 511-518) that is paired with a corresponding offset (e.g., one of the offsets 551-558).

Moreover, such iterations of operations 742-746 may be performed within a predetermined range of offsets (e.g., course offsets) relative to the reference point 460 (e.g., at which the reference segment 363 occurs in the reference audio 350). In some example embodiments, the predetermined range spans 15 seconds before and after the reference point 460 (e.g., corresponding to values that are +/−15 seconds forward and backward in time from the reference sub-fingerprint 453). In alternative example embodiments, the predetermined range spans 10 seconds before and after the reference point 460, 20 seconds before and after the reference point 460, or 30 seconds before and after the reference point 460.

Furthermore, such iterations of operations 742-746 may be performed such that the different offsets for each iteration are uniformly spaced apart from each other by a predetermined number of sub-fingerprints (e.g., spaced apart by a predetermined number of values for the offset 470). In some example embodiments, the predetermined uniform spacing between the different offsets (e.g., coarse offsets) is 10 sub-fingerprints (e.g., corresponding to 10 contiguous values of the offset 470). In alternative example embodiments, the predetermined uniform spacing is 15 sub-fingerprints (e.g., corresponding to 15 continuous values of the offset 470), 20 sub-fingerprints (e.g., corresponding to 20 contiguous values of the offset 470, or 30 sub-fingerprints (e.g., corresponding to 30 contiguous values of the offset 470).

In operation 742, for a given offset (e.g., offset 555) from the reference point 460, the vector generator 230 aligns (e.g., by repositioning or other shifting) the reference sub-fingerprints 451-456 (e.g., as a current subset of the reference sub-fingerprints in the reference fingerprint 450) with the query sub-fingerprints 411-416 at the offset (e.g., offset 555) from the reference point 460. In some example embodiments, this alignment is referred to as a coarse alignment (e.g., to determine an interim maximum total count of matches).

In operation 744, for the given offset (e.g., offset 555), the vector generator 230 determines a total count (e.g., total count 515) of matches between the query sub-fingerprints 411-416 and the reference sub-fingerprints 451-456 (e.g., as the current subset of the reference sub-fingerprints in the reference fingerprints 450). This total count (e.g., total count 515) corresponds to the given offset (e.g., offset 555) for the current iteration of operations 742-746.

In operation 746, for the given offset (e.g., offset 555), the vector generator 230 pairs the determined total count (e.g., total 515) with the given offset (e.g., offset 555) and stores the paired offset and its corresponding total count in the count vector 500. According to various example embodiments, the count vector 500 may be generated, stored, and updated within the matching machine 110, the database 115, the device 130, or any suitable combination thereof.

Operation 770 may be performed after operation 660, in which the match classifier 240 classifies the reference sub-fingerprints 451-456 as the match (e.g., the best matching subset of the reference fingerprints stored in the reference fingerprints 450) with the query sub-fingerprints 411-416. In operation 770, based on (e.g., in response to) the results of operation 770, the query responder 210 causes the device 130 to present a notification (e.g., within a message, alert, dialog box, or pop-up window) that the reference audio 350 matches the query audio 300. For example, if the accessing of the query fingerprint 410 in operation 610 was in response to reception of a request (e.g., in operation 700) to identify the query audio 300 or the query portion 301 thereof, operation 770 may be performed to alert the user 132 that the reference audio 350 matches the query audio 300 or the query portion 301. In some example embodiments, the notification also indicates an offset (e.g., offset 555, as a specific value of the offset 470) at which the query portion 301 matches the reference audio 350 (e.g., by matching the reference portion 351 of the reference audio 350). Accordingly, the user 132 of the device 130 can learn the identity of the query audio 300, as well as where the query portion 301 occurs within the reference audio 350.

Figure 8:
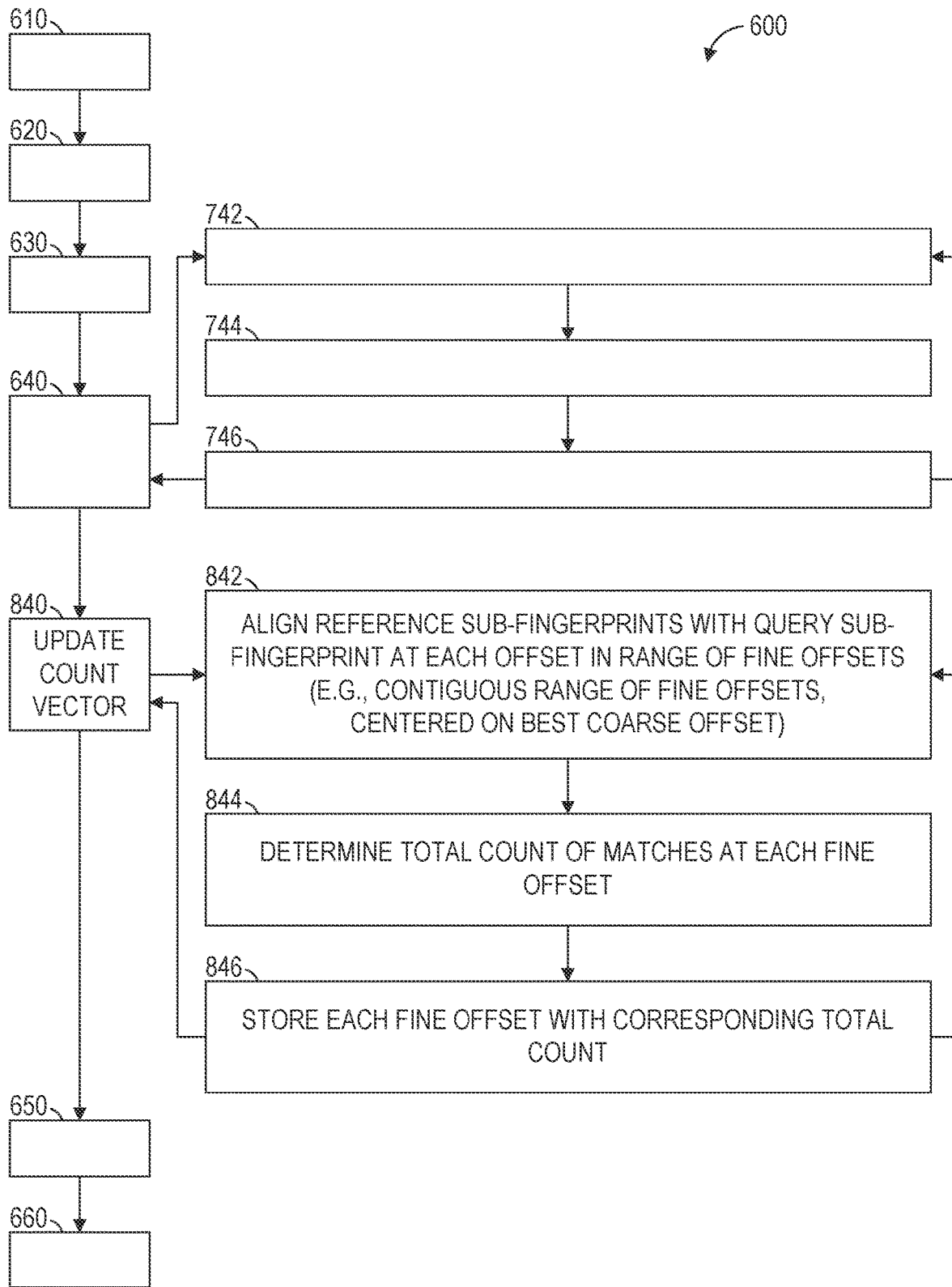

As shown in FIG. 8, in addition to one or more of the operations previously described, the method 600 may include one or more of operations 840, 842, 844, and 846. In operation 840, the vector generator 230 updates the count vector 500. In example embodiments in which operation 640 (e.g., including operation 742-746) constitute a coarse generation (e.g., a first pass, initial pass, interim pass, or coarse pass) of the count vector 500, this updating of the count vector 500 may constitute a fine-tuning (e.g., a second pass, final pass, or fine pass) of the count vector 500. The updating of the count vector 500 in operation 840 may be performed by analyzing the count vector 500 and determining the maximum total count of matches (e.g., total count 514) as a current maximum or interim maximum, and then performing the operations similar to operations 742, 744, and 746, except with smaller shifts in alignment between the query sub-fingerprints 411-416 and the reference sub-fingerprints 451-456. For example, if coarse shifts (e.g., large jumps of multiple contiguous values of the offset 470) were used in iterating through operations 742, 744, and 746, fine shifts (e.g., small jumps of single contiguous values of the offset 470) may be used in iterating through operations 842, 844, and 846.

Accordingly, the updating of the count vector 500 in operation 840 may include, for each different offsets among multiple offsets (e.g., offsets 551-558, which may be fine offsets in this example), performance of operations 742, 744, and 746. With each iteration of operations 842, 844, and 846, the vector generator 230 generates a total count of matches (e.g., one of the total counts 511-518) that is paired with a corresponding fine offset (e.g., one of the offsets 551-558).

Moreover, such iterations of operations 842-846 may be performed within a predetermined range of fine offsets (e.g., in contrast with course offsets) relative to (e.g., centered on) the current maximum total count or interim maximum total count (e.g., total count 514). In some example embodiments, the predetermined range spans 1 second before and after the current maximum total count or interim maximum total count (e.g., corresponding to values that are +/−1 second forward and backward in time from the current maximum total count or interim maximum total count). In alternative example embodiments, the predetermined range spans 1.5 seconds before and after the current maximum total count or interim maximum total count, 2 seconds before and after the current maximum total count or interim maximum total count, or 0.5 seconds before and after the current maximum total count or interim maximum total count.

In operation 842, for a given fine offset (e.g., offset 555) from the reference point 460, the vector generator 230 aligns the reference sub-fingerprints 451-456 (e.g., as a current subset of the reference sub-fingerprints in the reference fingerprint 450) with the query sub-fingerprints 411-416 at the fine offset (e.g., offset 555) from the reference point 460. In example embodiments that include operation 842, this alignment is referred to as a fine alignment (e.g., to potentially improve upon the previously determined interim maximum total count of matches).

In operation 844, for the given fine offset (e.g., offset 555), the vector generator 230 determines a total count (e.g., total count 515) of matches between the query sub-fingerprints 411-416 and the reference sub-fingerprints 451-456 (e.g., as the current subset of the reference sub-fingerprints in the reference fingerprints 450). This total count (e.g., total count 515) corresponds to the given fine offset (e.g., offset 555) for the current iteration of operations 842-846.

In operation 846, for the given fine offset (e.g., offset 555), the vector generator 230 pairs the determined total count (e.g., total 515) with the given fine offset (e.g., offset 555) and adds (e.g., by storing) the paired fine offset and its corresponding total count in the count vector 500, thus updating the count vector 500. As noted above, the count vector 500 may be stored and updated within the matching machine 110, the database 115, the device 130, or any suitable combination thereof. In example embodiments that include operation 840-846, the calculating of the maximum total count in operation 650 is performed on the updated count vector 500 and accordingly results in determination of a maximum total count (e.g., as a final or non-interim maximum total count) among the entirety of the total counts in the updated count vector 500 (e.g., including those derived from fine offsets).

Figure 9:
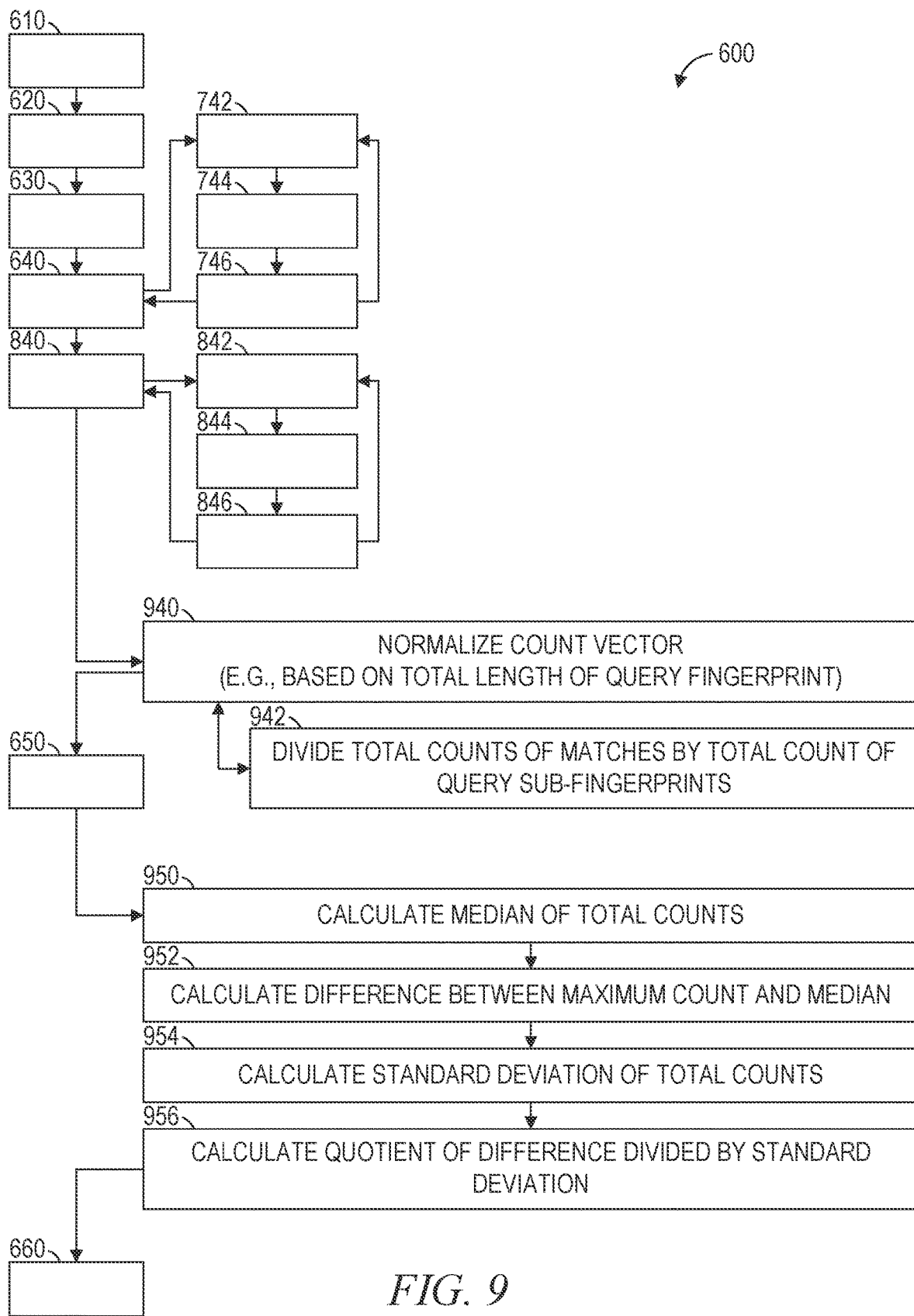

As shown in FIG. 9, in addition to one or more of the operations previously described, the method 600 may include one or more of operations 940, 942, 950, 952, 954, and 956. Operation 940 may be performed at any point prior to operation 650, in which the match classifier 240 calculates the maximum total count from the count vector 500. In operation 940, the match classifier 240 normalizes the count vector 500 (e.g., generated in operation 640, updated in operation 840, or both). This normalization may be based on a total length of the query fingerprint 410 (e.g., as represented by the total number of the query sub-fingerprints 411-416).

For example, operation 942 may be performed as part of 940. In operation 942, the match classifier 240 normalizes the count vector 500 by dividing each of the total counts of matches (e.g., each of the total counts 511-518) by the total count of the query sub-fingerprints 411-416. This may fully or partially compensate for the tendency for large query fingerprints (e.g., query fingerprint 410) with large numbers of query sub-fingerprints (e.g., query sub-fingerprints 411-416) to result in large numbers of matches with various reference sub-fingerprints (e.g., sub-fingerprints 451-456) in the reference fingerprint 450.

According to various example embodiments, between performance of operation 650 and 660, one or more additional calculations are performed prior to the classification of the reference sub-fingerprints 451-456 as the match with the query sub-fingerprints 411-416. These additional calculations are illustrated in FIG. 9 as operations 950, 952, 954, and 956.

In operation 950, the match classifier 240 calculates a median of the total counts of matches (e.g., total counts 511-518) in the count vector 500 (e.g., as generated in operation 640, as updated in operation 840, or both). Within example embodiments that include operation 950, performance of operation 660 is based on the median (e.g., median count). In certain example embodiments, a mean may be used instead of the median.

In operation 952, the match classifier 240 calculates a difference between the maximum count determined in operation 650 and the median determined in operation 950. This may be performed by subtracting the median from the maximum count. In example embodiments that include operation 952, performance of operation 660 is based on the calculated difference between the maximum count and the median.

In operation 954, the match classifier 240 calculates a standard deviation of the total counts of matches (e.g., total counts 511-518) in the count vector 500 (e.g., as generated in operation 640, as updated in operation 840, or both). In example embodiments that include operation 954, performance of operation 660 is based on the calculated standard deviation of the total counts (e.g., total counts 511-518) in the count vector 500.

In operation 956, the match classifier 240 calculates a quotient of the difference (e.g., as determined in operation 952) divided by the standard deviation of the total counts (e.g., as determined in operation 954). This may be performed by using the result of operation 952 as a dividend, using the results of operation 954 as a divisor, and calculating a quotient of the dividend and the divisor. In example embodiments that include operation 956, performance of operation 660 is based on the calculated quotient. For example, in performing operation 660, the match classifier 240 may calculate this quotient and use it as a score (e.g., a peak prominence score) that indicates the degree to which the maximum total count (e.g., from operation 650) represents a prominent peak within the count vector 500. The match classifier 240 may then compare the score to a predetermined threshold score (e.g., a minimum peak prominence score) and classify the reference sub-fingerprints 451-456 as the match with the query sub-fingerprints 411-416 based on this comparison.

In certain example embodiments, the match classifier 240 uses the quotient calculated in operation 956 in conjunction with the maximum total count calculated in operation 650. In particular, the match classifier 240 can be configured to generate and analyze a two-dimensional array (e.g., an x-y plot or graph) in which the quotient and the maximum total count form a pair of coordinates that defines a point. As configured, the match classifier 240 may then compare the point to a threshold line (e.g., a predetermined or machine-learned separator threshold line) to classify the reference sub-fingerprints 451-456 as the match with the query sub-fingerprints 411-416.

For example, in some example embodiments, the match classifier 240 forms all or part of a support vector machine that is configured to generate the threshold line (e.g., via machine learning). In some situations, the support vector machine is or includes a mathematical discriminative classifier. Accordingly, the support vector machine can be trained based on known points (e.g., known to correspond to matches or non-matches) and then used as a linear separator to compare the threshold line to the point represented by the quotient and the maximum total count.

According to some example embodiments, during training, the support vector machine attempts to find a separating line that minimizes the number of mismatches and maximizes the number correct matches. The mathematical distance between the maximum count and the median of the count vector (e.g., the difference between the maximum count and the median count) may be used as an input to the support vector machine, and the match classifier 240 may be configured to consider this mathematical distance in determining whether match exists. The use of the maximum count and the mathematical distance may be treated graphically as a function with two inputs, and each query accordingly may be represented as a point within a feature space in which the support vector machine has generated the threshold line. In this feature space, classification by the match classifier 240 may occur based on the position of that point relative to the threshold line (e.g., on which side of the line the point exists).

According to various example embodiments, one or more of the methodologies described herein may facilitate matching of audio fingerprints (e.g., matching query fingerprint 410 to reference fingerprint 450). Moreover, one or more of the methodologies described herein may facilitate matching of audio data (e.g., matching query audio data 310 to reference audio data 360) or matching segments thereof (e.g., matching the query segments 311-316 to the reference segments 361-366). Hence, one or more of the methodologies described herein may facilitate matching portions of audio (e.g., matching the query portion 301 to the reference portion 351), as well as identification of audio (e.g., query audio 300) or portions thereof (e.g., query portion 301).

When these effects are considered in aggregate, one or more of the methodologies described herein may obviate a need for certain efforts or resources that otherwise would be involved in matching audio fingerprints, matching audio data, matching portions of audio, identification of audio, or any suitable combination thereof. Efforts expended by a user in identifying audio may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 10:
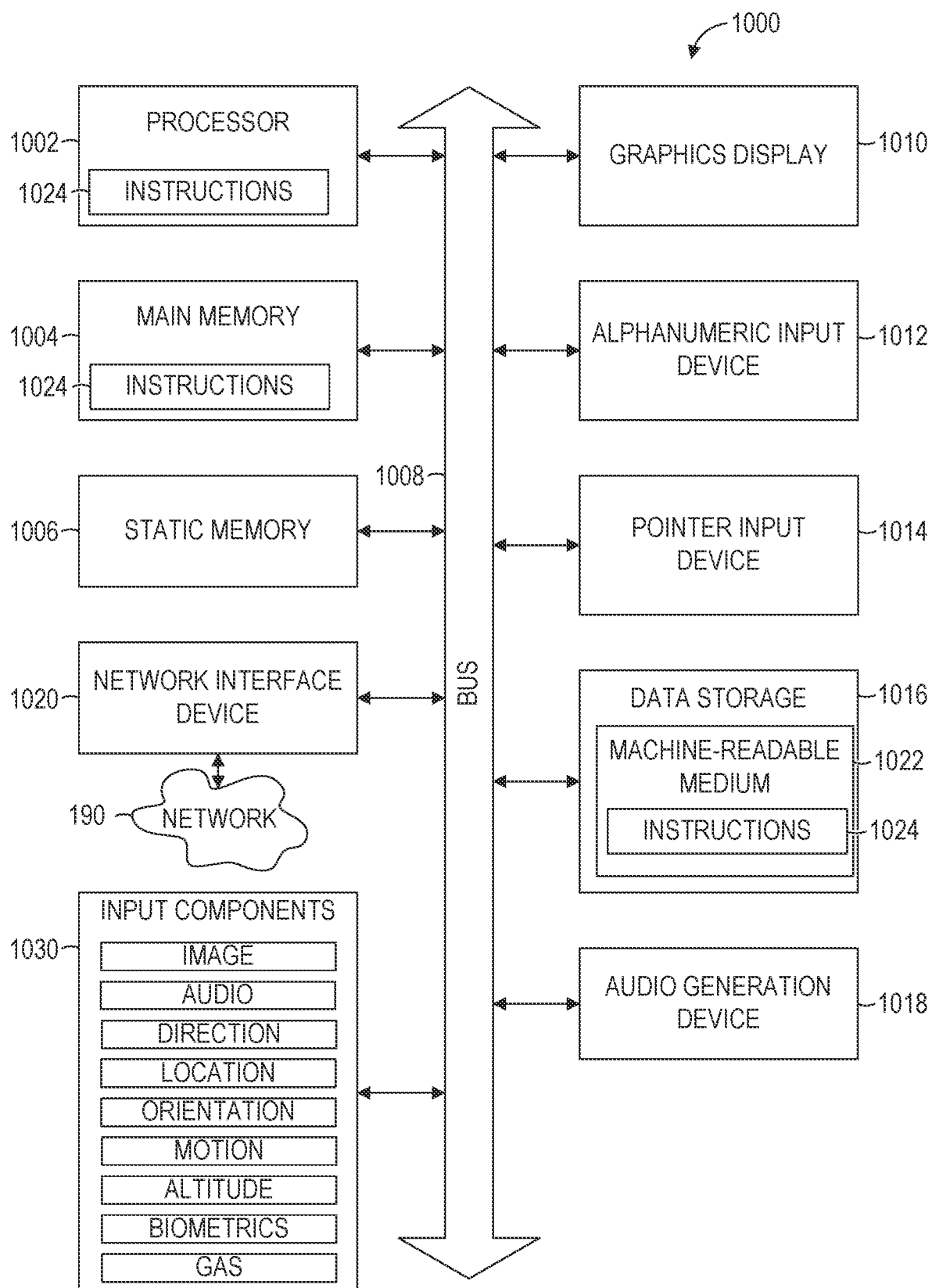
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be communicatively coupled (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1004, and a static memory 1006, which are configured to communicate with each other via a bus 1008. The processor 1002 contains solid-state digital microcircuits (e.g., electronic, optical, or both) that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein. In some example embodiments, the processor 1002 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1000 with at least the processor 1002, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a pointer input device 1014 (e.g., a mouse, a touchpad, a touchscreen, a trackball, a joystick, a stylus, a motion sensor, an eye tracking device, a data glove, or other pointing instrument), a data storage 1016, an audio generation device 1018 (e.g., a sound card, an amplifier, a speaker, a headphone jack, or any suitable combination thereof), and a network interface device 1020.

The data storage 1016 (e.g., a data storage device) includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the static memory 1006, within the processor 1002 (e.g., within the processor's cache memory), or any suitable combination thereof, before or during execution thereof by the machine 1000. Accordingly, the main memory 1004, the static memory 1506, and the processor 1002 may be considered machine-readable media (e.g., tangible and non-transitory machine-readable media). The instructions 1024 may be transmitted or received over the network 190 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device (e.g., a smart phone, a tablet computer, or a wearable device), and may have one or more additional input components 1030 (e.g., sensors or gauges). Examples of such input components 1030 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1024 for execution by the machine 1000 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1024).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
accessing, by one or more processors, a query fingerprint that includes query sub-fingerprints generated from query segments of a portion of query audio to be identified;
 accessing, by the one or more processors, a database in which an index maps reference sub-fingerprints generated from reference segments of reference audio to points at which the reference segments occur in the reference audio;
 selecting, by the one or more processors, the reference sub-fingerprints for comparison to the query sub-fingerprints based on a determination that a query sub-fingerprint among the query sub-fingerprints is a match with a reference sub-fingerprint among the reference sub-fingerprints, the reference sub-fingerprint being mapped by the index to a reference point at which a reference segment among the reference segments occurs in the reference audio;
 generating, by the one or more processors, a count vector that stores total counts of matches between the query sub-fingerprints and different subsets of the reference sub-fingerprints, each of the different subsets being aligned to the query sub-fingerprints at a different offset from the reference point, each of the different offsets being mapped by the count vector to a different total count among the total counts;
 calculating, by the one or more processors, a maximum count among the total counts stored in the count vector; and
 classifying, by the one or more processors, the reference sub-fingerprints as a match with the query sub-fingerprints based on the maximum count in the count vector.

A second embodiment provides a method according to the first embodiment, further comprising:
 receiving a request that the query audio be identified, the request including the query fingerprint; and wherein
 the accessing of the query fingerprint accesses the query fingerprint in the received request that the query audio be identified.

A third embodiment provides a method according to the first embodiment, further comprising:
 receiving a request that the query audio be identified, the request including the portion of the query audio to be identified; and wherein
 the accessing of the query fingerprint includes generating the query fingerprint from the portion of the query audio in response to the received request that the query audio be identified.

A fourth embodiment provides a method according to any of the first through third embodiments, wherein:
 the selecting of the reference sub-fingerprints for comparison includes matching the query sub-fingerprint to the reference sub-fingerprint mapped by the index to the reference point at which the reference segment occurs in the reference audio.

A fifth embodiment provides a method according to any of the first through fourth embodiments, wherein:
 the generating of the count vector includes, for each different offset from the reference point at which the reference segment occurs in the reference audio:
 aligning the reference sub-fingerprints with the query sub-fingerprints at the offset from the reference point;
 determining a total count of matches between the query sub-fingerprints and a different subset of the aligned reference sub-fingerprints; and
 storing the offset paired with its corresponding total count in the count vector.

A sixth embodiment provides a method according to the fifth embodiment, wherein:
 the generating of the count vector is performed by iteratively performing the aligning, the determining, and the storing for the different offsets within a predetermined range of offsets relative to the reference point at which the reference segment occurs in the reference audio.

A seventh embodiment provides a method according to any of the first through sixth embodiments, wherein:
 the different offsets are spaced apart from each other by a predetermined number of sub-fingerprints.

An eighth embodiment provides a method according to the seventh embodiment, wherein:
 the different offsets are coarse offsets uniformly spaced apart from each other by multiple sub-fingerprints;
 the maximum count is a coarse maximum count mapped to a best coarse offset by the count vector; and the method further comprises:
 updating the count vector by, for each fine offset among different fine offsets from the best coarse offset:

aligning the reference sub-fingerprints with the query sub-fingerprints at the fine offset from the best coarse offset;

determining a total count of matches between the query sub-fingerprints and a different subset of the aligned reference sub-fingerprints; and storing the fine offset paired with its corresponding total count in the count vector; and updating the maximum count among the total counts in the count vector, the updated maximum count corresponding to a fine offset among the different fine offsets from the best coarse offset.

A ninth embodiment provides a method according to the eighth embodiment, wherein:

the updating of the count vector is performed by iteratively performing the aligning, the determining, and the storing for the different fine offsets within a predetermined range of fine offsets relative to the best coarse offset.

A tenth embodiment provides a method according to the eighth embodiment or the ninth embodiment, wherein:

the different fine offsets are contiguous and form a range of fine offsets centered on the best coarse offset.

An eleventh embodiment provides a method according to any of the first through tenth embodiments, further comprising:

normalizing the count vector based on a total length of the query fingerprint.

A twelfth embodiment provides a method according to the eleventh embodiment, wherein:

the normalizing of count vector includes dividing each of the total counts of matches in the count vector by a total count of the query sub-fingerprints.

A thirteenth embodiment provides a method according to any of the first through twelfth embodiments, further comprising:

calculating a median of the total counts in the count vector; and wherein the classifying of the reference sub-fingerprints as the match with the query sub-fingerprints is based on the median of the count vector.

A fourteenth embodiment provides a method according to the thirteenth embodiment, further comprising:

calculating a difference between the maximum count and the median of the total counts; and wherein the classifying of the reference sub-fingerprints as the match with the query sub-fingerprints is based on the difference between the maximum count and the median of the total counts.

A fifteenth embodiment provides a method according to any of the first through fourteenth embodiments, further comprising:

calculating a standard deviation of the total counts in the count vector; and wherein the classifying of the reference sub-fingerprints as the match with the query sub-fingerprints is based on the standard deviation of the total counts.

A sixteenth embodiment provides a method according to the fifteenth embodiment, further comprising:

calculating a difference between the maximum count and a median of the total counts; and calculating a quotient of the difference divided by the standard deviation of the total counts; and wherein the classifying of the reference sub-fingerprints as the match with the query sub-fingerprints is based on the quotient of the difference divided by the standard deviation of the total counts.

A seventeenth embodiment provides a machine-readable medium (e.g., a non-transitory machine-readable storage medium) comprising instructions that, when executed by one or more processors of a machine, cause the machine to perform operations comprising:

accessing a query fingerprint that includes query sub-fingerprints generated from query segments of a portion of query audio to be identified;

accessing a database in which an index maps reference sub-fingerprints generated from reference segments of reference audio to points at which the reference segments occur in the reference audio;

selecting the reference sub-fingerprints for comparison to the query sub-fingerprints based on a determination that a query sub-fingerprint among the query sub-fingerprints is a match with a reference sub-fingerprint among the reference sub-fingerprints, the reference sub-fingerprint being mapped by the index to a reference point at which a reference segment among the reference segments occurs in the reference audio;

generating a count vector that stores total counts of matches between the query sub-fingerprints and different subsets of the reference sub-fingerprints, each of the different subsets being aligned to the query sub-fingerprints at a different offset from the reference point, each of the different offsets being mapped by the count vector to a different total count among the total counts;

calculating a maximum count among the total counts stored in the count vector; and classifying the reference sub-fingerprints as a match with the query sub-fingerprints based on the maximum count in the count vector.

An eighteenth embodiment provides a method according to the seventeenth embodiment, wherein:

the accessing of the query fingerprint is in response to reception of a request to identify the query audio, the request being received from a client device; and the operations further comprise:

causing the client device to present a notification that the reference audio matches the query audio, the causing being based on the classifying of the reference sub-fingerprints as the match with the query sub-fingerprint.

A nineteenth embodiment provides a system (e.g., matching machine 110 or device 130) comprising:

one or more processors; and a memory storing instructions that, when executed by at least one processor among the one or more processors, cause the system to perform operations comprising:

accessing a query fingerprint that includes query sub-fingerprints generated from query segments of a portion of query audio to be identified;

accessing a database in which an index maps reference sub-fingerprints generated from reference segments of reference audio to points at which the reference segments occur in the reference audio;

selecting the reference sub-fingerprints for comparison to the query sub-fingerprints based on a determination that a query sub-fingerprint among the query sub-fingerprints is a match with a reference sub-fingerprint among the reference sub-fingerprints, the reference sub-fingerprint being mapped by the index to a reference point at which a reference segment among the reference segments occurs in the reference audio;

generating a count vector that stores total counts of matches between the query sub-fingerprints and different subsets of the reference sub-fingerprints, each of the different subsets being aligned to the query sub-fingerprints at a different offset from the reference point, each of the different offsets being mapped by the count vector to a different total count among the total counts;

calculating a maximum count among the total counts stored in the count vector; and classifying the reference sub-fingerprints as a match with the query sub-fingerprints based on the maximum count in the count vector.

A twentieth embodiment provides a system according to the nineteenth embodiment, wherein:

the accessing of the query fingerprint is in response to reception of a request to identify the query audio, the request being received from a client device; and the operations further comprise:

causing the client device to present a notification that the reference audio matches the query audio, the notification indicating a portion offset at which the portion of the query audio matches the reference audio, the causing being based on the classifying of the reference sub-fingerprints as the match with the query sub-fingerprint.

A twenty-first embodiment provides a carrier medium carrying machine-readable instructions for controlling a machine to carry out the operations recited in any one of the previously described embodiments.

What is claimed is:

1. An apparatus comprising:
at least one storage device; and
at least one processor to execute instructions to at least:
select reference sub-fingerprints generated from reference segments of audio for comparison to query sub-fingerprints based on a determination that a query sub-fingerprint among the query sub-fingerprints is a match with a reference sub-fingerprint among the reference sub-fingerprints;
obtain a query fingerprint that includes the query sub-fingerprints generated from query segments of a portion of query audio to be identified;
access a database in which an index maps the reference sub-fingerprints generated from reference segments of the audio to points at which the reference segments occur in the audio, the reference sub-fingerprint being mapped by the index to the reference point at which a reference segment among the reference segments occur in the audio;
generate a count vector that stores total counts of matches between the query sub-fingerprints and different subsets of the reference sub-fingerprints, each of the different subsets being aligned to the query sub-fingerprints at a different offset from a reference point corresponding to the reference sub-fingerprint, each of the different offsets being mapped by the count vector to a different total count among the total counts;
calculate a maximum count among the total counts stored in the count vector;
calculate a median of the total counts in the count vector;
calculate a difference between the maximum count and the median of the total counts; and
classify the reference sub-fingerprints as a match with the query sub-fingerprints based on the difference between the maximum count in the count vector and the median of the total counts.

2. The apparatus of claim 1, wherein the query sub-fingerprints are generated from query segments of a portion of query audio, and the at least one processor is to obtain a request that the query audio is identified, the request including the query sub-fingerprints, and accessing the query sub-fingerprints includes accessing the query sub-fingerprint in the obtained request that the query audio be identified.

3. The apparatus of claim 1, wherein the query sub-fingerprints are generated from query segments of a portion of query audio, and the at least one processor is to obtain a request that the query audio be identified, the request including the portion of the query audio to be identified and accessing the query sub-fingerprints includes generating the query sub-fingerprints from the portion of the query audio in response to the obtained request that the query audio be identified.

4. The apparatus of claim 1, wherein the at least one processor is to match the query sub-fingerprint to the reference sub-fingerprint mapped by an index to the reference point at which a reference segment among the reference segments of audio occurs in the audio to select the reference sub-fingerprints for comparison.

5. The apparatus of claim 1, wherein the at least one processor is to, for each different offset from the reference point at which the reference segment occurs in the audio:

align the reference sub-fingerprints with the query sub-fingerprints at the offset from the reference point;

determine a total count of matches between the query sub-fingerprints and a different subset of the aligned reference sub-fingerprints; and store the offset paired with its corresponding total count in the count vector.

6. The apparatus of claim 1, wherein the at least one processor is to:

extract an additional feature from the count vector without using the maximum count in the count vector; and classify the reference sub-fingerprints as a match with the query sub-fingerprints based on the difference between the maximum count in the count vector, the median of the total counts, and the additional feature.

7. A non-transitory computer readable storage medium comprising instructions that, when executed, cause one or more processors to at least:

select reference sub-fingerprints generated from reference segments of audio for comparison to query sub-fingerprints based on a determination that a query sub-fingerprint among the query sub-fingerprints is a match with a reference sub-fingerprint among the reference sub-fingerprints;

obtain a query fingerprint that includes the query sub-fingerprints generated from query segments of a portion of query audio to be identified;

access a database in which an index maps the reference sub-fingerprints generated from reference segments of the audio to points at which the reference segments occur in the audio, the reference sub-fingerprint being mapped by the index to the reference point at which a reference segment among the reference segments occurs in the audio;

generate a count vector that stores total counts of matches between the query sub-fingerprints and different subsets of the reference sub-fingerprints, each of the different subsets being aligned to the query sub-fingerprints at a different offset from a reference point corresponding to the reference sub-fingerprint, each of the different offsets being mapped by the count vector to a different total count among the total counts;

calculate a maximum count among the total counts stored in the count vector;

calculate a median of the total counts in the count vector;
calculate a difference between the maximum count and the median of the total counts; and
classify the reference sub-fingerprints as a match with the query sub-fingerprints based on the difference between the maximum count in the count vector and the median of the total counts.

8. The non-transitory computer readable storage medium of claim 7, wherein the query sub-fingerprints are generated from query segments of a portion of query audio and the instructions, when executed, cause the one or more processor to obtain a request that the query audio be identified, the request including the query sub-fingerprints, and accessing the query sub-fingerprints includes accessing the query sub-fingerprint in the obtained request that the query audio be identified.

9. The non-transitory computer readable storage medium of claim 7, wherein the query sub-fingerprints are generated from query segments of a portion of query audio and the instructions, when executed, cause the one or more processors to:
to obtain a request that the query audio be identified, the request including the portion of the query audio to be identified and accessing the query sub-fingerprints includes generating the query sub-fingerprint from the portion of the query audio in response to the obtained request that the query audio be identified.

10. The non-transitory computer readable storage medium of claim 7, wherein the instructions, when executed, cause the one or more processors to match the query sub-fingerprint to the reference sub-fingerprint mapped by an index to the reference point at which a reference segment among the reference segments of audio occurs in the audio to select the reference sub-fingerprints for comparison.

11. The non-transitory computer readable storage medium of claim 7, wherein the instructions, when executed, cause the one or more processors to, for each different offset from the reference point at which the reference segment occurs in the audio:
align the reference sub-fingerprints with the query sub-fingerprints at the offset from the reference point;
determine a total count of matches between the query sub-fingerprints and a different subset of the aligned reference sub-fingerprints; and
store the offset paired with its corresponding total count in the count vector.

12. The non-transitory computer readable storage medium of claim 7, wherein the instructions, when executed, cause the one or more processors to:
extract an additional feature from the count vector without using the maximum count in the count vector; and
classify the reference sub-fingerprints as a match with the query sub-fingerprints based on the difference between the maximum count in the count vector, the median of the total counts, and the additional feature.

13. An apparatus comprising:
means for selecting reference sub-fingerprints generated from reference segments of audio for comparison to query sub-fingerprints based on a determination that a query sub-fingerprint among the query sub-fingerprints is a match with a reference sub-fingerprint among the reference sub-fingerprints;
means for accessing to:
obtain a query fingerprint that includes the query sub-fingerprints generated from query segments of a portion of query audio to be identified; and
access a database in which an index maps the reference sub-fingerprints generated from reference segments of the audio to points at which the reference segments occur in the audio, the reference sub-fingerprint being mapped by the index to the reference point at which a reference segment among the reference segments occur in the audio;
means for generating a count vector that stores total counts of matches between the query sub-fingerprints and different subsets of the reference sub-fingerprints, each of the different subsets being aligned to the query sub-fingerprints at a different offset from a reference point corresponding to the reference sub-fingerprint, each of the different offsets being mapped by the count vector to a different total count among the total counts;
means for calculating to:
calculate a maximum count among the total counts stored in the count vector;
calculate a median of the total counts in the count vector;
calculate a difference between the maximum count and the median of the total counts; and
means for classifying the reference sub-fingerprints as a match with the query sub-fingerprints based on the difference between the maximum count in the count vector and the median of the total counts.

14. The apparatus of claim 13, wherein the query sub-fingerprints are generated from query segments of a portion of query audio, the apparatus further including means for accessing a request that the query audio be identified, the request including the query sub-fingerprints, and accessing the query sub-fingerprints includes accessing the query sub-fingerprint in the obtained request that the query audio be identified.

15. The apparatus of claim 13, wherein the query sub-fingerprints are generated from query segments of a portion of query audio, the apparatus further including means for accessing a request that the query audio be identified, the request including the portion of the query audio to be identified and accessing the query sub-fingerprints includes generating the query sub-fingerprints from the portion of the query audio in response to the obtained request that the query audio be identified.

16. The apparatus of claim 13, wherein the means for selecting are to match the query sub-fingerprint to the reference sub-fingerprint mapped by an index to the reference point at which a reference segment among the reference segments of audio occurs in the audio to select the reference sub-fingerprints for comparison.

17. The apparatus of claim 13, wherein the means for generating are to, for each different offset from the reference point at which the reference segment occurs in the audio:
align the reference sub-fingerprints with the query sub-fingerprints at the offset from the reference point;
determine a total count of matches between the query sub-fingerprints and a different subset of the aligned reference sub-fingerprints; and
store the offset paired with its corresponding total count in the count vector.

\* \* \* \* \*